No. 674,203. Patented May 14, 1901.
V. R. GATES.
SPECTACLES OR EYEGLASSES.
(Application filed Nov. 23, 1900.)
(No Model.)

WITNESSES:

INVENTOR
Verner R. Gates
BY
ATTORNEYS

THE NORRIS PETERS CO., PHOTO-LITHO., WASHINGTON, D. C.

UNITED STATES PATENT OFFICE.

VERNER R. GATES, OF SHERMAN, MICHIGAN, ASSIGNOR OF ONE-HALF TO THOMAS WILSON, OF TRAVERSE CITY, MICHIGAN.

SPECTACLES OR EYEGLASSES.

SPECIFICATION forming part of Letters Patent No. 674,203, dated May 14, 1901.

Application filed November 23, 1900. Serial No. 37,496. (No model.)

*To all whom it may concern:*

Be it known that I, VERNER R. GATES, a citizen of the United States, and a resident of Sherman, in the county of Wexford and State of Michigan, have invented new and useful Improvements in Spectacles or Eyeglasses, of which the following is a full, clear, and exact description.

This invention relates to improvements in spectacles and eyeglasses of the class in which supplemental or slip lenses are employed, adapting them for use by persons compelled to use two different strengths of lenses, one for close or near sight and the other for distance, and obviating the employment of two pairs of glasses; and the object is to provide a slip-lens holder of simple construction so arranged that when not in use it may be turned down toward the wearer's face and held at substantially right angles to the main lenses.

I will first describe the invention and then point out the novel features in the appended claims.

Reference is to be had to the accompanying drawings, forming a part of this specification, in which similar characters of reference indicate corresponding parts in all the figures.

Figure 1:
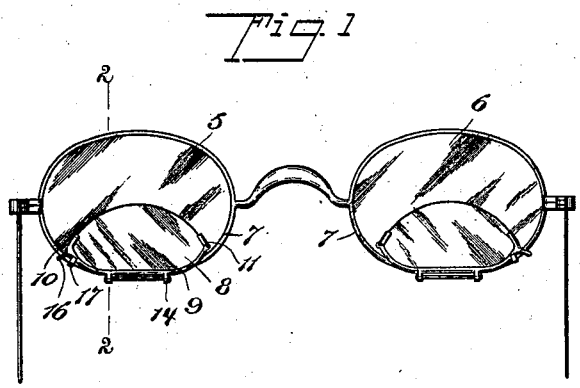
Figure 2:
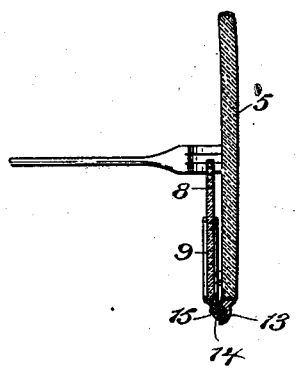
Figure 3:
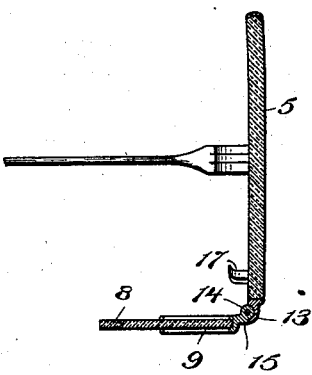
Figure 4:
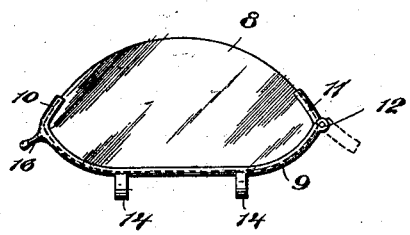

Figure 1 is an inside view of a pair of spectacles embodying my invention. Fig. 2 is a section on the line 2 2 of Fig. 1. Fig. 3 is a similar section, but showing the slip-lens in its lowered position; and Fig. 4 shows one of the slip-lenses removed from the main lens.

As illustrating the application of the improvement it is shown in the drawings as applied to spectacles; but it is to be understood that it is equally as applicable to eyeglasses and will in practice be applied to them as well as to spectacles.

Referring to the drawings, 5 6 designate the main lenses of spectacles, which lenses are placed in frames 7. Adapted to fold up against the inner side of each main lens is a supplemental or slip lens 8, substantially oval in shape and embracing the lower portion only of the main lens. The slip-lens frame 9 extends around the lower portion of the slip-lens and has one rigid end 10 engaging around one end of said slip-lens, while the other end 11 has pivotal connection with the main portion of the frame 9, so that by swinging this portion 11 outward, as indicated by dotted lines in Fig. 4, the slip-lens may be easily removed or inserted, and when inserted it may be rigidly held by turning the portion 11 upward, as shown in full lines in the drawings, and tightening a screw 12.

The frame 9 has swinging connection with the lower portion of the frame 7. As here shown, the frame 7 has hinged lugs 13, with which hinged lugs 14 on the slip-frame engage. The lugs 14 are provided with shoulders 15 to engage with the ends of the lugs 13, as indicated in Fig. 3, to hold the slip-lens at substantially right angles to the main lens when turned downward and toward a person's face. The slip-lens frame 9 at its end 10 is provided with a finger-piece 16, and a clip 17, attached to the frame 7, is adapted to engage with the slip-frame to hold said slip-frame in its upper position.

In use when a person desires to see at a distance the slip-lenses are turned downward, and the main lenses 5 and 6 are employed. When using the device for near work, the slip-lenses are to be turned upward into the line of vision. These changes in the position of the slip-lenses may be readily made without removing the glasses from the face.

Having thus described my invention, I claim as new and desire to secure by Letters Patent—

1. The combination with the main lenses of spectacles or the like, of auxiliary or slip lenses, of a size to extend over the lower portion of the main lenses, frames for the lenses hinged to the lower portions of the main-lens frames, said auxiliary or slip lens frames, each comprising a bottom portion having end portions extending around the ends only of said lenses, whereby the frames will extend around only a portion of the lenses, and means for locking the auxiliary or slip lens frames to the main-lens frames, substantially as described.

2. The combination with spectacles or the like, of slip-lens frames having pivotal connection with the lower portions of the eyeglass-frames, the said slip-lens frames having portions for engaging along the lower side of the slip-lens, a rigid portion for engaging over one end of the said slip-lens, and a swinging portion for engaging with the opposite end of the slip-lens, substantially as specified.

3. A lens-frame, comprising a lower portion having end portions which extend upwardly and inwardly a short distance from their junction with the said lower portion, one of the end portions being rigid and the other hinged, as set forth.

In testimony whereof I have signed my name to this specification in the presence of two subscribing witnesses.

VERNER R. GATES.

Witnesses:
H. B. STURTEVANT,
J. D. CRISS.